United States Patent
Hellenthal et al.

(10) Patent No.: US 6,327,670 B1
(45) Date of Patent: Dec. 4, 2001

(54) DUPLEX PROCESSOR WITH AN UPDATE BUS AND METHOD FOR OPERATING THE UPDATE BUS

(75) Inventors: Klaas Hellenthal, Ermelo (NL); Ricky Raymond McTee, Yorkville, IL (US); Douglas Alan Reneker, Naperville, IL (US); Gordon Douglas Woods, Randolph; Wai-Ching Yu, Holmdel, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/236,060

(22) Filed: Jan. 22, 1999

(51) Int. Cl.[7] .............................. G06F 11/20; G06F 11/16; G06F 12/00
(52) U.S. Cl. .................................... 714/5; 714/10
(58) Field of Search ................................ 714/5–7, 10, 11, 714/13; 711/142, 162; 710/52, 129; 713/100; 712/220; 370/216; 379/279

(56) References Cited

U.S. PATENT DOCUMENTS 3,767,863 * 10/1973 Borbas et al. .
5,761,705 * 6/1998 DeKoning et al. .
5,778,206 * 7/1998 Pain et al. .
6,073,251 * 6/2000 Jewett et al. .

* cited by examiner

Primary Examiner—Gopal C. Ray

(57) ABSTRACT

A duplex controller with a pair of redundant processor circuits connected by an update bus for use in a system which requires high reliability. Each of the redundant processor circuits is individually capable of performing the tasks of the duplex controller, so that the controller remains operable when one of the processor circuit members fails. The update bus is connected so that when the active circuit member executes a write command, the write command is also effected at the standby circuit. In this manner the memory state of the standby is dynamically maintained so that when control of the duplex controller is transferred from the active to the standby to the standby circuit, the standby circuit is instantaneously ready with up to date information to assume all processing responsibilities of the duplex controller without unnecessary delay.

18 Claims, 2 Drawing Sheets

DUPLEX PROCESSOR WITH AN UPDATE BUS AND METHOD FOR OPERATING THE UPDATE BUS

BACKGROUND OF THE INVENTION

1. Field of the Invention

The present invention relates to a duplex controller having a write through update bus connecting an active processor circuit and a redundant standby processor circuit for updating the memory of the standby processing circuit when the memory of the active processing circuit is updated.

2. Description of the Related Art

The fault tolerance of a data processing system relates to the ability of the system to continue performing a task after the occurrence of a fault. One of the ways in which systems achieve increased fault tolerance is by incorporating hardware redundancy. Fault tolerance is extremely important in systems which require high reliability such as aircraft control systems, life-support systems, and other industrial control systems. Redundant or duplicative data processors are used in controllers to increase the availability and reliability of the systems in which they are used.

Controllers which have standby processors may comprise many different configurations. For example, some systems include a quasi-duplicative arrangement in that only some of the parts of the circuit are duplicated. In other configurations in which high reliability is extremely critical, the entire circuits are duplicated. However, even in those systems in which an entire hardware circuit is duplicated, some amount of time is required to switch from using the active controller to the standby controller. For example, if the standby controller lacks the state information of the failed active side, the system must re-initialize to allow the standby side, which is now the active side, to recreate or reproduce a useful state, which is time consuming. This associated delay deteriorates the availability of the overall device which may include many of these redundant circuits. One way to avoid this delay is to have the standby controller perform ongoing tasks simultaneously with the active controller. In this way, the standby processor is always in the same state as the active processor and can assume control immediately. However, this arrangement consumes approximately double the power of a single circuit and may therefore be prohibitive in many systems in which numerous components have a redundant standby device. Also, these types of circuits normally require additional complex circuitry for ensuring that the active and standby circuits are performing the same operations simultaneously and producing the same results.

SUMMARY OF THE INVENTION

The present invention provides a duplex controller with a pair of redundant processor circuit members connected by an update bus. The duplex controller is designed for use in a system which requires high reliability. To that end, each of the redundant processor circuit members is individually capable of performing the tasks of the duplex controller. Thus, the controller remains operable when one of the processor circuit members fails. In addition, the update bus is connected such that when the active member executes a write command, the write command is also effected at the standby circuit. The memory of the standby circuit is maintained so that when control of the duplex controller is transferred to the standby circuit, the memory of the standby circuit is instantaneously ready with up to date information, thereby limiting the delay time required for switching control to the standby circuit and maximizing the availability of the overall system.

Each processor circuit member includes a processor, memory, and an update bus interface. At any given time, one of the processor circuit members is in an active state. The active member executes applications and software programs to perform tasks. The second member is in a standby state and stands by ready to become active, if needed. The update bus connects the pair of processor circuits so that each member has access to the other member's memory. In a normal update mode of the duplex controller, all writes to the memory of the active processor are transmitted via the update bus to the standby processor's memory, thereby keeping the standby processor's memory and registers up to date, so that the standby member can immediately assume control when required.

The connection between the pair of processors may be disabled, loosely coupled, or tightly coupled. In loosely coupled operation, either memory may be accessed by the other of the active and standby members. In tightly coupled operation, all writes to the active member memory are automatically mapped to both the active and standby members, with no intervention from software.

The update bus may be operated in the following modes:

Normal Mode—In this mode, the two members are tightly coupled. All read operations are directed to the local side only. However, each write operation is performed at the local (active) side with a matching write to the mate (standby);

Forced Local—This mode is used when it is desired that only the local memory space is to be accessed, without disturbing devices on the mate side;

Forced Mate—This mode is used when it is desired that only the mate memory space be accessed, without disturbing the devices on the local side; and Forced Both—This mode is very similar to Normal Mode except that both local and mate memories are accessed during both read and write operations. This mode may be used when it is necessary to trigger the same strobe point on both the local and mate sides.

As stated above, the write through update bus according to the present invention is designed to limit the amount of time required to switch control from the active processing circuit to the standby processing circuit. Therefore, the circuit operates most efficiently if it is operated in Normal Mode as often as possible. This ensures that the standby processing circuit is always ready to assume control of the duplex controller with up-to-date memory.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
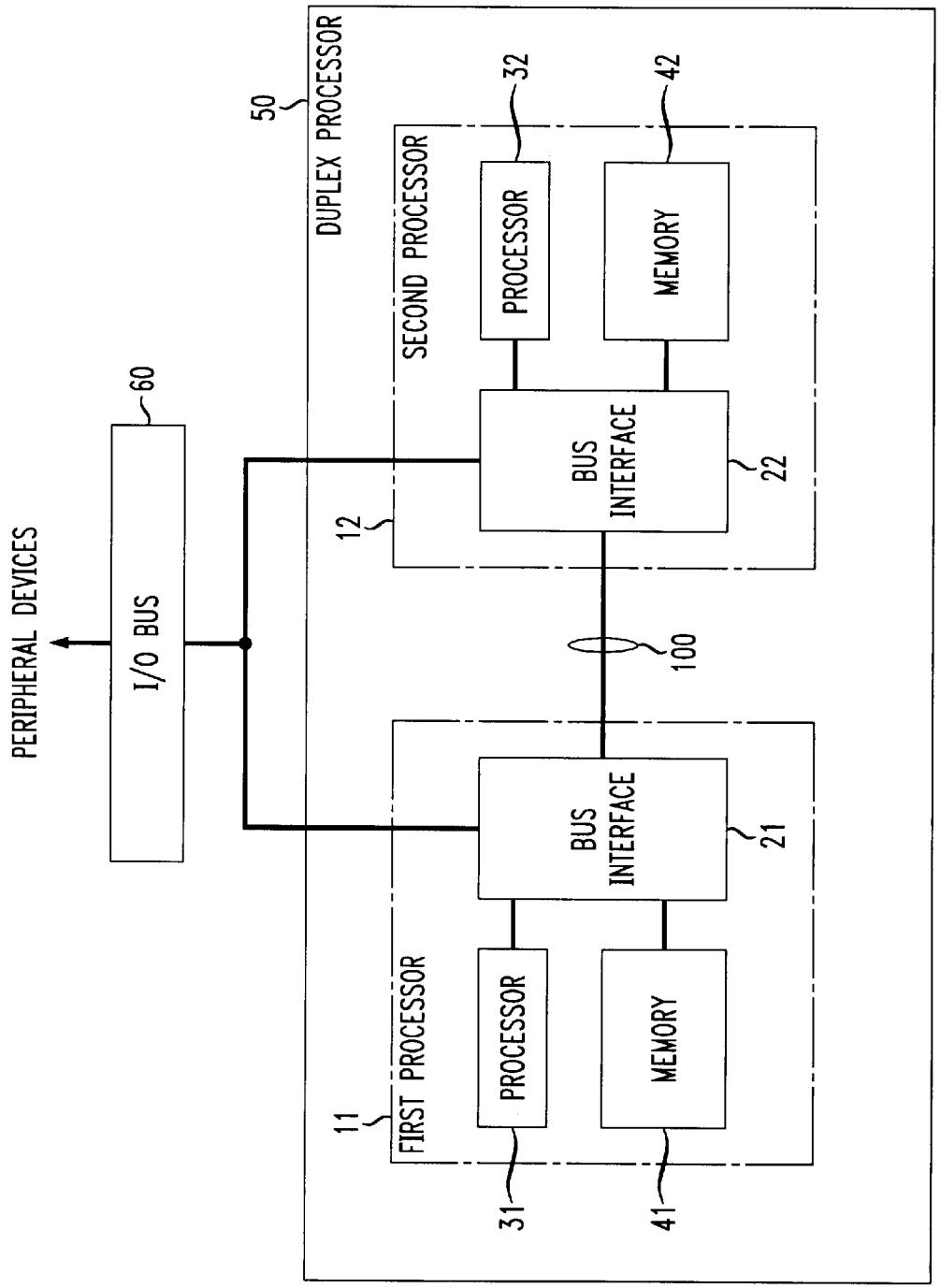
FIG. 1 is a block diagram of a duplex processor constructed in accordance with the present invention.

FIG. 1 depicts a duplex processor 50 in accordance with a first preferred embodiment of the present invention.

Duplex processor 50 includes a first processing unit 11 and a second processing unit 12 which are redundant processing units. First processing unit 11 includes a processor 31, a memory 41 and a bus interface 21, and a second processing unit 12 likewise includes a processor 32, a memory 42 and a bus interface 22. The processors 31 and 32 are preferably microprocessors operative for performing specific types of tasks but may also comprise any type of processor. The memories 41 and 42 may be implemented by any type of computer memory devices. The bus interfaces 21 and 22 are each connectable to one or more external devices via a communication channel such, for example, as an I/O Bus 60 which connects the duplex processor 50 with the peripheral devices of a system in which the duplex processor 50 operates. The bus interfaces 21 and 22 are also connected to each other by an update bus 100. The bus interfaces 21, 22 include controls which direct the flow of data to and from the I/O Bus 60 and the flow of data between the first and second processing circuits 11, 12 via the update bus 100. This control is effected via logic contained in bus interfaces 21, 22 that is responsible for bus arbitration, control of the update bus, and decoding addresses.

Since the first and second processing circuits 11 and 12 are redundant, only one is required to perform the tasks required of the duplex processing circuit 50. During operation, one of the first and second processing units 11, 12 is considered to be in an active state and the other of the first and second processing units 11, 12 is considered to be in a standby state. Generally, the processing unit that is in the active state is referred to as the active member and the processing unit in the standby state is called the standby member. In addition, when one of the members of a duplex pair is discussed, it is referred to as the local member and the other member is referred to as the mate. In the following description, the first processor 11 is assumed by way of illustrative example to be the active member and local member and the second processor 12 is assumed to be the standby member and mate member. Since the first and second processors are redundant, it will be recognized that the first processor 11 may also be the standby member and mate member, in which case the second processor 12 will be the active member and local member.

The active member 11 of the duplex processor 50 receives instructions from the I/O Bus 60 for executing a task and transmits a result back to the I/O Bus 60. The standby member is, by definition, not active. If the standby member 12 is not out-of-service, then it is ready to become active when required. The standby member 12 will be required to become active, for example, when a fault occurs in the active member 11 or when active member 11 becomes disabled for any reason. The standby member 12 may be out-of-service for many reasons including repairs, diagnostic testing, and if the unit is suspected to be faulty. When the standby member 12 is out-of-service, the memory of standby member 12 is not accessible. To ensure that the memory of standby member 12 which has been out-of-service is updated as soon as possible, the memory of the standby member is updated to match the memory of the active member as soon as the standby member 12 is returned to service.

The update bus 100 is used to connect the first and second processing units 11 and 12 so that each has full access to the other's memory. Update bus 100 may be one of disabled, operated as loosely coupled, or operated as tightly coupled. In loosely coupled operation, either memory may be accessed by the other of the active and standby members. In tightly coupled operation, all writes to the active member memory are automatically mapped to both the active and standby members, with no intervention from software. The bus interfaces 21 and 22 may operate the update bus 100 in one of four modes. In normal mode, the update bus 100 is operated as tightly coupled with all read operations directed to the active member 11 and each write operation directed to both the active member 11 and the standby member 12. This keeps the memory 42 of standby member 12 dynamically equivalent to the memory 41 of active member 11 so that, if required, the standby member 12 may immediately be switched to active and take over the processing responsibilities of the active members without having to first download information from the prior active member 11.

Other modes of operation of the update bus 100 include a forced local mode in which only the local memory 41 is accessed for both read and write operations, and a forced mate mode in which only the mate memory 42 is accessed. Yet another mode in which the update bus 100 may be operated is the forced both mode; in this mode, both the local and mate memories 41, 42 are accessed for both read and write operations. Forced both mode is used, for example, when it is necessary to trigger the same strobe point (i.e., an address in memory which causes some side-effect when appropriately accessed) on both the active member 11 and standby member 12.

Figure 2:
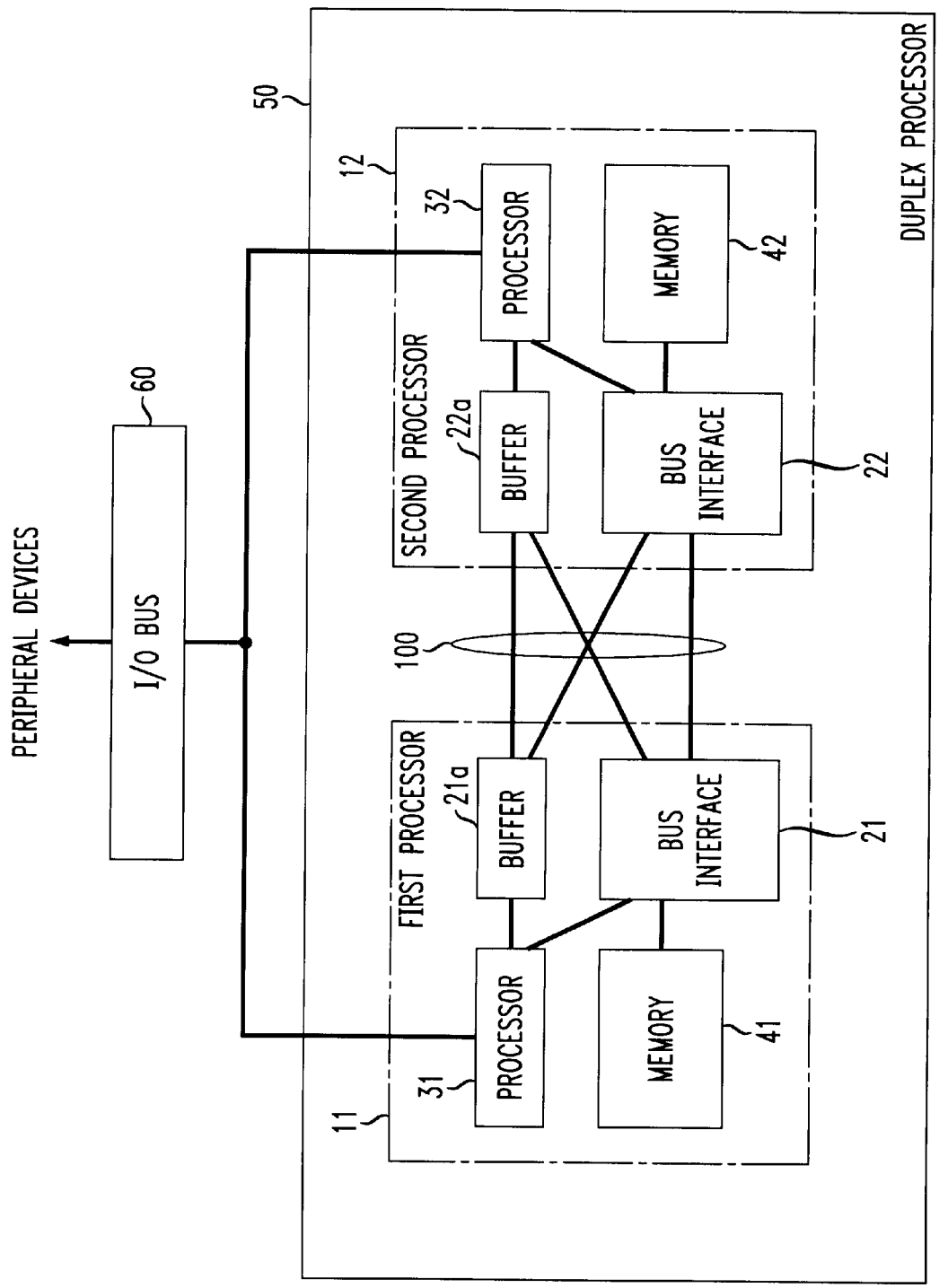
FIG. 2 is a block diagram of another embodiment of the duplex processor of the invention.

In an alternative embodiment, shown in FIG. 2, each of the first and second processing units 11 and 12 of FIG. 1 additionally includes a buffer 21a and 22a, respectively, for transmitting information over the update bus 100. The buffers 21a, 22a are controlled by the respective bus interfaces 21, 22. The buffers 21a, 22a may be separate from the bus interfaces 21, 22 or may form as an integrated part of the bus interfaces.

When the standby member 12 is busy and temporarily unable to process or handle a new write command, the buffer 21a stores the write and thus allows processor 31 continue its ongoing or a new task. The capacity of update bus 100 is designed to be greater than the long term average write rate. However, buffer 21a is useful because the write commands in active member 11 may occur within a short time period at a rate much faster than the write-through update bus 100 can transmit them. The buffers 21a and 22a thus help to smooth out these busy periods.

FIG. 2 also shows the processors 31, 32 connected to the I/O Bus 60 instead of the bus interfaces 21, 22 as in FIG. 1. In the FIG. 2 embodiment, commands received from I/O Bus 60 may be processed directly in the processor. However, bus control information is passed from the processor 31 to bus interface 21. In both embodiments shown, either the bus interfaces 21, 22 or the processors 31, 32 can be connected to the I/O bus 60.

While there have been shown and described and pointed out fundamental novel features of the invention as applied to preferred embodiments thereof, it will be understood that various omissions and substitutions and changes in the methods described and in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

We claim:

1. A duplex processing circuit connectable to an I/O bus, comprising:
   a first processing circuit including a first memory and a first interface;
   a second processing circuit including a second memory and a second interface, said first circuit and said second circuit being redundant and operatively interconnected such that one of said first circuit and said second circuit is an active circuit interactable with the I/O bus for receiving one of an application command, a software command, and data from the I/O bus and for transmitting data to the I/O bus in response to said one of the application command, software command, and data from the I/O bus, and such that the other of said first circuit and said second circuit is a standby circuit ready to become active and take over processing responsibility of said active circuit when required;
   an update bus operatively connecting said first interface and said second interface and through which the first memory is accessible by said second processing circuit and the second memory is accessible by said first processing circuit via said update bus; and
   each of said first interface and said second interface comprising means for transmitting a write command received by said active circuit to the memory of said active circuit and to the memory of said standby circuit so that the memory of the standby circuit is maintained up to date with the memory of the active circuit when said duplex processing circuit is operated in a first mode of operation, thereby limiting a time required for said standby circuit to become active and take over the processing responsibilities of said active circuit when required.

2. The duplex processing circuit of claim 1, wherein each of said first interface and said second interface further comprises means for transmitting a read command to only the memory of said active circuit when said duplex processing circuit is operated in the first mode of operation.

3. The duplex processing circuit of claim 1, wherein each of said first interface and said second interface further comprises means for transmitting a read command received by said active circuit to said standby circuit via said update bus for accessing the memory of said standby circuit in a second mode of operation.

4. The duplex processing circuit of claim 1, wherein each said first interface and said second interface comprises means for transmitting a write command received by said active circuit via said update bus to said standby circuit for accessing only the memory of said standby circuit in a third mode of operation.

5. The duplex processing circuit of claim 1, wherein each of said first interface and said second interface further comprises means for operating in a fourth mode of operation in which said first memory and said second memory are substantially concurrently accessed in response to read commands and to write commands received by said active circuit.

6. The duplex processing circuit of claim 1, wherein said first processing circuit further comprises a first buffer circuit and said second processing circuit further comprises a second buffer circuit, and wherein said update bus is further connected between said first buffer circuit and said second buffer circuit.

7. The duplex processing circuit of claim 6, wherein said first buffer circuit comprises means for storing commands for transmission to said second processing circuit when said second processing circuit is busy, and means for transmitting the stored commands to said second processing circuit when said second processing circuit is ready to receive the stored commands.

8. The duplex processing circuit of claim 6, wherein each of said first and second interfaces further comprises means for disabling said update bus when said standby circuit is out-of-service, and wherein each of said first and second processing circuits further comprises means for updating the memory of said standby processing circuit via said update bus when said standby processing circuit is returned to service.

9. The duplex processing circuit of claim 1, wherein said first and second interfaces are configured for connecting said duplex processing circuit to the I/O bus.

10. The duplex processing circuit of claim 1, wherein said first processing circuit further comprises a first processor connected to said first memory and to said first interface, and wherein said second processing circuit further comprises a second processor connected to said second memory and to said second interface, and wherein said first and second processors are configured for connecting said duplex processing circuit to the I/O bus.

11. A method for operating an update bus connected between an active processor circuit and a standby processor circuit in a duplex controller, comprising the steps of:
   connecting the active processor circuit to the standby processor circuit with an update bus through which the active processor circuit has access to a memory of the standby processor circuit and the standby processor circuit has access to a memory of the active processor circuit; and
   transmitting a write command received by the active processor circuit both to the memory of the active processor and to the memory of the standby processor circuit via the update bus so that the memory of the standby processor circuit is maintained in a same state as the memory of the active processor circuit when the duplex controller is operated in a normal mode of operation, thereby limiting a time required for the standby circuit to become active and take over the processing responsibilities of the active surface when required.

12. The method of claim 11, wherein said step of transmitting comprises the steps of:
   receiving the write command at the duplex controller;
   determining whether the duplex controller is operating in the normal mode; and
   performing said step of transmitting if it is determined that the duplex controller is in the normal mode.

13. The method of claim 11, wherein said step of transmitting further comprises:
   determining whether the standby circuit is busy;
   performing said step of transmitting when the standby circuit is determined to be not busy; and
   storing the write commands in a buffer in the active processing circuit when the standby processing circuit is determined to be busy, and transmitting the stored write commands to the standby processing circuit is determined to have become ready to receive the stored write commands.

14. The method of claim 11, wherein said step of transmitting further comprises:

determining whether the standby circuit is out-of-service;

performing the step of transmitting when it is determined that said standby service is not out-of-service; and updating the memory of the standby circuit when it is determined that the standby circuit has been returned to service if it is determined that the standby circuit is out-of-service.

15. The method of claim 11, further comprising the step of transmitting a read command to only the memory of the active processor when the duplex controller is operated in the normal mode of operation.

16. The method of claim 11, further comprising the step of transmitting a read command both to the memory of the active processor and to the memory of the standby processor via the update bus when the duplex controller is operated in a second mode of operation.

17. The method of claim 11, further comprising the step of transmitting read commands and write commands only to the memory of the active processor when the duplex controller is operated in a third mode of operation.

18. The method of claim 11, further comprising the step of transmitting read commands and write commands only to the memory of the standby processor via the update bus when the duplex controller is operated in a fourth mode of operation.

* * * * *